United States Patent
Muralitharan et al.

(10) Patent No.: US 7,865,390 B2
(45) Date of Patent: Jan. 4, 2011

(54) MODELING OF EMPLOYEE PERFORMANCE RESULT DATA

(75) Inventors: Caroline Muralitharan, San Jose, CA (US); Maria Theresa Barnes Leon, Fremont, CA (US); Darayush H. Mistry, Sunnyvale, CA (US); Marcelo Andreas Vasquez Rico, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1373 days.

(21) Appl. No.: 10/851,306

(22) Filed: May 21, 2004

(65) Prior Publication Data

US 2007/0226049 A1  Sep. 27, 2007

(51) Int. Cl.
 *G06F 11/34* (2006.01)
(52) U.S. Cl. ............................. 705/11; 705/7
(58) Field of Classification Search ............ 705/11
 See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A | 8/1995 | Balgeman et al. | 707/9 |
| 5,566,332 A | 10/1996 | Adair et al. | 707/101 |
| 5,646,862 A | 7/1997 | Jolliffe et al. | 703/1 |
| 5,699,527 A | 12/1997 | Davidson | 705/38 |
| 5,708,828 A | 1/1998 | Coleman | 395/785 |
| 5,724,575 A | 3/1998 | Hoover et al. | 707/10 |
| 5,727,158 A | 3/1998 | Bouziane et al. | 709/225 |
| 5,742,588 A | 4/1998 | Thornberg et al. | 370/236 |
| 5,758,355 A | 5/1998 | Buchanan | 707/201 |
| 5,806,075 A | 9/1998 | Jain et al. | 707/201 |
| 5,930,764 A | 7/1999 | Melchione et al. | 705/10 |
| 5,953,710 A | 9/1999 | Fleming | 705/38 |
| 5,970,490 A | 10/1999 | Morgenstern | 707/10 |
| 6,032,136 A | 2/2000 | Brake et al. | 705/41 |
| 6,053,947 A | 4/2000 | Parson | 703/14 |
| 6,178,418 B1 | 1/2001 | Singer | 707/3 |
| 6,216,130 B1 | 4/2001 | Hougaard et al. | 707/10 |

(Continued)

FOREIGN PATENT DOCUMENTS

DE 101 50 391 A1 5/2002

(Continued)

OTHER PUBLICATIONS

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

(Continued)

*Primary Examiner*—Kambiz Abdi
*Assistant Examiner*—Sarah M Monfeldt
(74) *Attorney, Agent, or Firm*—Campbell Stephenson LLP

(57) ABSTRACT

An employee performance result class is defined that represents an employee performance result and identifies relationships of the employee performance result with various entities related to the employee performance result.

24 Claims, 7 Drawing Sheets

U.S. PATENT DOCUMENTS

| | | | |
|---|---|---|---|
| 6,226,649 B1 | 5/2001 | Bodamer et al. | 707/104.1 |
| 6,233,566 B1 | 5/2001 | Levine et al. | 705/36 R |
| 6,236,997 B1 | 5/2001 | Bodamer et al. | 707/10 |
| 6,275,812 B1 | 8/2001 | Haq et al. | 705/11 |
| 6,336,124 B1 | 1/2002 | Alam et al. | 715/523 |
| 6,341,289 B1 | 1/2002 | Burroughs et al. | 707/104.1 |
| 6,343,275 B1 | 1/2002 | Wong | 705/26 |
| 6,377,952 B1 | 4/2002 | Inohara et al. | 707/101 |
| 6,385,620 B1 | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,754,679 B2 | 6/2004 | Oheda | 707/201 |
| 6,778,651 B1 | 8/2004 | Jost et al. | 379/201.01 |
| 6,792,431 B2* | 9/2004 | Tamboli et al. | 707/102 |
| 6,826,542 B1 | 11/2004 | Virgin et al. | 705/34 |
| 6,826,568 B2 | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 | 5/2005 | Gupta et al. | 717/105 |
| 6,912,719 B2 | 6/2005 | Elderon et al. | 719/319 |
| 6,944,514 B1 | 9/2005 | Matheson | 700/98 |
| 6,947,947 B2 | 9/2005 | Block et al. | 707/102 |
| 6,996,776 B1 | 2/2006 | Makely et al. | 715/207 |
| 7,043,687 B2 | 5/2006 | Knauss et al. | 715/236 |
| 7,099,350 B2 | 8/2006 | Peterson | 370/465 |
| 7,111,010 B2 | 9/2006 | Chen | 707/102 |
| 7,111,077 B1 | 9/2006 | Starkovich et al. | 709/246 |
| 7,124,112 B1 | 10/2006 | Guyan et al. | 705/44 |
| 7,133,882 B1 | 11/2006 | Pringle et al. | 1/1 |
| 7,139,766 B2 | 11/2006 | Thomson et al. | 707/101 |
| 7,143,100 B2 | 11/2006 | Carlson et al. | 707/101 |
| 7,257,594 B2* | 8/2007 | Tamboli et al. | 707/101 |
| 7,287,041 B2 | 10/2007 | Barnes-Leon et al. | 707/104.1 |
| 7,337,192 B2 | 2/2008 | Stark et al. | 707/104.1 |
| 2001/0011245 A1 | 8/2001 | Duhon | 705/38 |
| 2001/0051907 A1 | 12/2001 | Kumar et al. | 705/36 |
| 2002/0007343 A1 | 1/2002 | Oyama et al. | 705/39 |
| 2002/0019765 A1* | 2/2002 | Mann et al. | 705/11 |
| 2002/0023004 A1 | 2/2002 | Hollander et al. | 705/22 |
| 2002/0035431 A1 | 3/2002 | Ell | 702/5 |
| 2002/0035488 A1 | 3/2002 | Aquila et al. | 705/4 |
| 2002/0040313 A1 | 4/2002 | Hunter et al. | 705/9 |
| 2002/0040339 A1 | 4/2002 | Dhar et al. | 705/38 |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0138532 A1 | 9/2002 | Chandra et al. | 709/206 |
| 2002/0169867 A1 | 11/2002 | Mann et al. | 709/224 |
| 2002/0174417 A1* | 11/2002 | Sijacic et al. | 717/147 |
| 2002/0178077 A1 | 11/2002 | Katz et al. | 705/26 |
| 2002/0184085 A1* | 12/2002 | Lindia et al. | 705/11 |
| 2002/0184148 A1 | 12/2002 | Kahn et al. | 705/40 |
| 2002/0188538 A1 | 12/2002 | Robertson et al. | 705/35 |
| 2003/0014617 A1* | 1/2003 | Tamboli et al. | 713/1 |
| 2003/0023580 A1 | 1/2003 | Braud et al. | 703/3 |
| 2003/0071852 A1 | 4/2003 | Stimac | 345/810 |
| 2003/0097642 A1 | 5/2003 | Arai et al. | 716/1 |
| 2003/0131018 A1* | 7/2003 | Godoy et al. | 707/104.1 |
| 2003/0163597 A1 | 8/2003 | Hellman et al. | 709/316 |
| 2003/0163603 A1 | 8/2003 | Fry et al. | 709/328 |
| 2003/0229529 A1 | 12/2003 | Mui et al. | 705/8 |
| 2004/0015515 A1* | 1/2004 | Beisiegel et al. | 707/103 Y |
| 2004/0034661 A1 | 2/2004 | Barron et al. | 707/104.1 |
| 2004/0039576 A1 | 2/2004 | He et al. | 705/1 |
| 2004/0093351 A1 | 5/2004 | Lee et al. | 707/104.1 |
| 2004/0122826 A1 | 6/2004 | Mackie | 707/100 |
| 2004/0128188 A1* | 7/2004 | Leither et al. | 705/11 |
| 2004/0162774 A1 | 8/2004 | Del Ray et al. | 705/36 |
| 2004/0199536 A1 | 10/2004 | Barnes-Leon et al. | 705/26 |
| 2004/0215503 A1* | 10/2004 | Allpress et al. | 705/11 |
| 2004/0230605 A1* | 11/2004 | Tamboli et al. | 707/102 |
| 2004/0249854 A1 | 12/2004 | Barnes-Leon et al. | 703/103 Y |
| 2005/0021391 A1* | 1/2005 | Lu et al. | 705/11 |
| 2005/0091249 A1* | 4/2005 | Hanson et al. | 707/101 |
| 2005/0160361 A1 | 7/2005 | Young | 715/513 |
| 2005/0197880 A1 | 9/2005 | Walsh et al. | 705/8 |
| 2006/0271446 A1 | 11/2006 | Barnes-Leon et al. | 705/26 |
| 2007/0033531 A1* | 2/2007 | Marsh | 715/738 |
| 2007/0203710 A1 | 8/2007 | Habichler et al. | 705/1 |
| 2007/0208577 A1 | 9/2007 | Barnes-Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0226037 A1 | 9/2007 | Garg et al. | 705/1 |
| 2007/0226049 A1 | 9/2007 | Muralitharan et al. | 705/11 |
| 2007/0226093 A1 | 9/2007 | Chan et al. | 705/38 |
| 2007/0250408 A1 | 10/2007 | Leon et al. | 705/28 |
| 2007/0250419 A1 | 10/2007 | Kumar et al. | 705/34 |
| 2007/0265944 A1 | 11/2007 | Catahan, Jr. et al. | 705/30 |

FOREIGN PATENT DOCUMENTS

| | | |
|---|---|---|
| JP | 2001 256308 | 9/2001 |
| WO | WO 0143031 A1 | 6/2001 |
| WO | WO 01/88759 A1 | 11/2001 |
| WO | WO 03/003641 A2 | 1/2003 |

OTHER PUBLICATIONS

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage enriched information across product development, sales and service; Combination of Siebel eBusiness Applications and PTC Collaborative Product Development solutions to deliver competitive advantage, M2 Presswire, Conventry: Jan. 24, 2002, 3 pages, (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML for Electronic Data Interchange." Presented at XML One-San Jose, Sep./Oct. 2001. Downloaded from http://web.archive.org/web/20040413182700/http://www.xmledi-group.org/.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3schools.com/Schema/schema_complex_empty.asp?; 7 pages.

Routledge et al., UML and XML Schema, 2002, pp. 1-10.

Walter J. Savitch, Java an Introduction to Computer Science & Programming, 2000, p. 478.

Walter J. Savitch, Java an Introduction to Computer Science & Programming, 2000, pp. 458-467.

Walter J. Savitch, Java an Introduction to Computer Science & Programming, 2000, p. 1.

* cited by examiner

MODELING OF EMPLOYEE PERFORMANCE RESULT DATA

FIELD OF THE INVENTION

This invention relates generally to data modeling, and more particularly to modeling of employee performance result data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Siebel Systems, Inc., All Rights Reserved.

BACKGROUND OF THE INVENTION

Employee Relationship Management (ERM) is a critical business process that enables a company's employees to do their job better. In particular, ERM allows a company to better manage relationships with its workforce and to improve the working practices and effectiveness of the workforce. Typically, an ERM system of a company maintains a variety of information associated with employees, including information identifying employee performance results. An employee performance result may be provided by an employee's supervisor or peer and may need to be accessible to human resources, the employee, and higher management.

Currently, no software product exists that allows various systems maintained by an organization (e.g., a Human Resource Management System (HRMS), an ERM, etc.) to share data on employee performance results. This creates difficulties in collaboration between different divisions of an organization and impedes successful management of relationships with employees within the organization.

SUMMARY OF THE INVENTION

The present invention relates to various aspects for modeling employee performance result data.

According to one aspect of the present invention, an employee performance result class is defined that represents an employee performance result and identifies relationships of an employee performance result with various entities related to the employee performance result.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
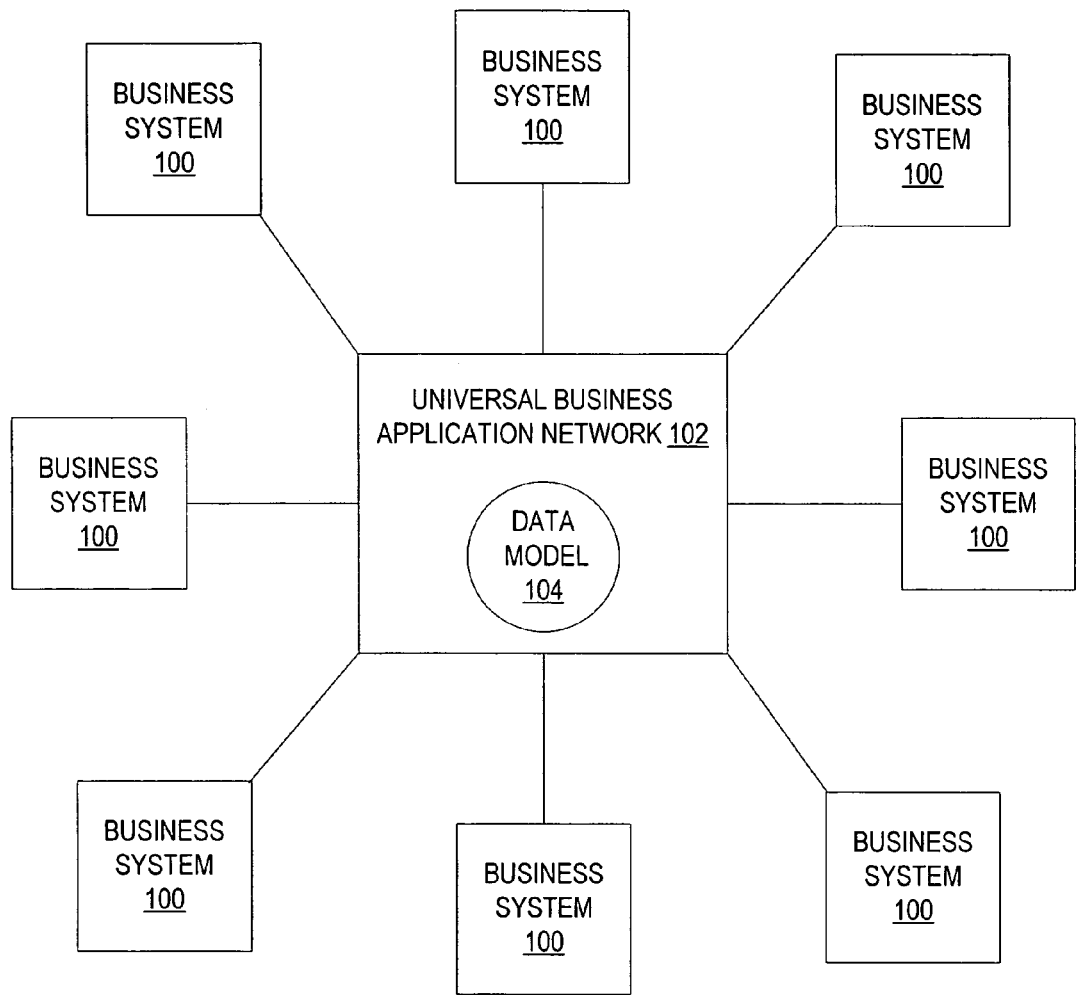
FIG. 1 is a block diagram illustrating the interconnection between various business systems and a universal business application network, according to one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; electrical, optical, and acoustical.

A data model that provides a common data structure to represent an employee performance result and allows for customization of the data model in a manner that facilitates upgrading of the data model is described. An employee performance result represents an evaluation of performance of an employee, a consultant, or any other individual performing work for a company. An employee performance result may be based on input provided by a supervisor, a peer, an employee himself, a client, or any combination of these and other entities. Employee performance result data may be used by various applications and systems within the company (e.g., a Human Resource Management System (HRM) system, an Employee Relationship Management (ERM) system, custom software applications, etc.). In addition, employee performance result data may be used by applications and systems of outside entities (e.g., the company's client for which an employee performs a particular task, a consulting business whose employee provides service for the company, etc.).

In one embodiment, the employee performance result data model defines relationships of an employee performance result with various entities related to the employee performance result. These entities may include, for example, a related employee (an employee associated with the employee performance result), related reviews (reviews of the employee's performance), and a related time period (a time period associated with the employee performance result).

The data model models the relationships as attributes associated with an employee performance result. In one embodiment, the employee performance result data model is specified using a schema language such as XML Schema.

In one embodiment, the data model defines a hierarchy of the data elements for describing an employee performance result. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements that are specific to different applications or systems. Because the custom data elements are defined at various places within the hierarchy, the customizations of the data model can be associated with related data elements within the hierarchy.

Thus, the employee performance result data model provides a common data structure for interfacing employee performance result data by various divisions within an organization or multiple organizations, while allowing for simplified customization of this data structure by individual divisions and/or companies in accordance with their needs. Hence, the employee performance result data model allows companies to maintain, support and upgrade only a single data model and facilitates efficient data transformations and mappings.

FIG. 1 is a block diagram illustrating the interconnection between various business systems 100 (business systems utilizing employee performance result related data) and a universal business application network 102, according to one embodiment of the present invention. The universal business application network 100 serves as an integration hub for the business systems 100. The architecture of the universal business application network 102 allows new applications (e.g., HRM applications and ERM applications) that access legacy business systems to be developed with minimum customization. The legacy business systems can be provided by a single business organization or by different business organizations. The universal business application network 102 allows the HRM and ERM applications to exchange information using an employee performance result data model 104.

In one embodiment, the employee performance result data model 104 defines a hierarchical data structure representing an employee performance result. This hierarchical data structure includes data elements that are common to all business systems 100. In addition, the hierarchical data structure includes custom data elements at various levels of the hierarchy to define data fields that are specific to each business system 100, thus providing for easy customization of the employee performance result data model 104.

In one embodiment, the universal business application network 102 uses the XML and Web services standards.

Figure 2:
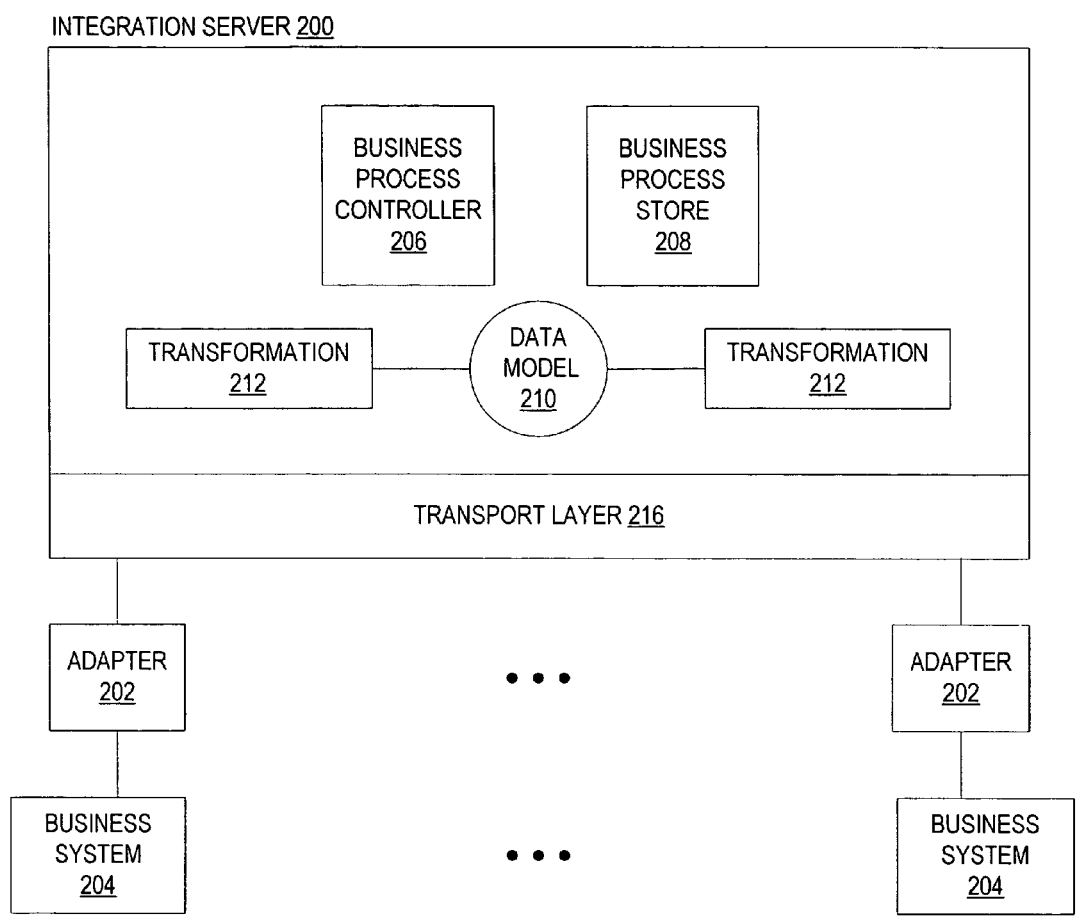
FIG. 2 is a block diagram illustrating the overall architecture of a universal business application network, according to one embodiment of the present invention.

FIG. 2 is a block diagram illustrating the overall architecture of a universal business application network in one embodiment. The hub of the universal business application network is an integration server 200 that connects to the various business systems 204 (e.g., business systems utilizing employee performance result data) via adapters 202. The integration server 200 includes a transport layer 216, a data model 210, a transformation store 214, a business process controller 206, and a business process store 208.

The transport layer 216 is a mechanism through which business information is exchanged between the business systems 204 and the business integration server 200. Each business system 204 may have an adapter 202 that is appropriate to the protocol of the transport layer. For example, the transport mechanism may use communications protocols such as TCP/IP. The transport layer 216 may provide a messaging service for queuing, for guaranteeing delivery of messages, and for handling both synchronous and asynchronous messaging. The adapters 202 relay events from the business systems 204 to the integration server 200 and can import configurations of the business systems 204 into the integration server 200. In addition, the universal business application network may include encryption and authentication mechanisms to ensure the security and integrity of the information. For example, authentication will help ensure that a business process is accessing the intended business system, rather than an impostor business system.

The integration server 200 stores the representation of a data model 210 (e.g., in an XML schema file) that contains the definition of an employee performance result class. The employee performance result class represents an employee performance result and defines relationships of the employee performance result with various related entities.

The transformation store 212 contains a model data definition tool (e.g., an XML schema definition tool) to create a definition of the data model 210 (e.g., in an XML schema file) and to customize the data model 210 when requested by adding custom data fields to the data model 210. The transformation store 212 also contains transformations for transforming information received from the business systems 204 to the format used by the data model 210, and vice versa. The transformations may be specified as a computer program, an XML Stylesheet Language Transform (XSLT), etc.

The business process store 208 contains the business processes that have been defined. A business process may be specified as a script, a process flow, an executable program, etc. In one embodiment, the business processes are defined using the Web Services Flow Language (OOWSFL). The business processes orchestrate a sequence of steps across multiple applications provided by the business systems 204 to achieve a business objective.

The business process controller 206 coordinates the execution of the business processes. The business process controller 206 may instantiate the employee performance result class and invoke functions of the resulting object in accordance with the various business processes. The business process controller 206 may also initiate the execution of business processes based on predefined conditions and events. For example, the business process controller 206 may launch a certain business process each time an alert is received. Although not shown, the business integration network may provide a standard library of business routines that may be invoked by the business processes. The integration server 200 may also include various tools to facilitate the development of business processes. These tools may aid in the development of transformations, the defining of classes, and the writing of process flows.

Figure 3:
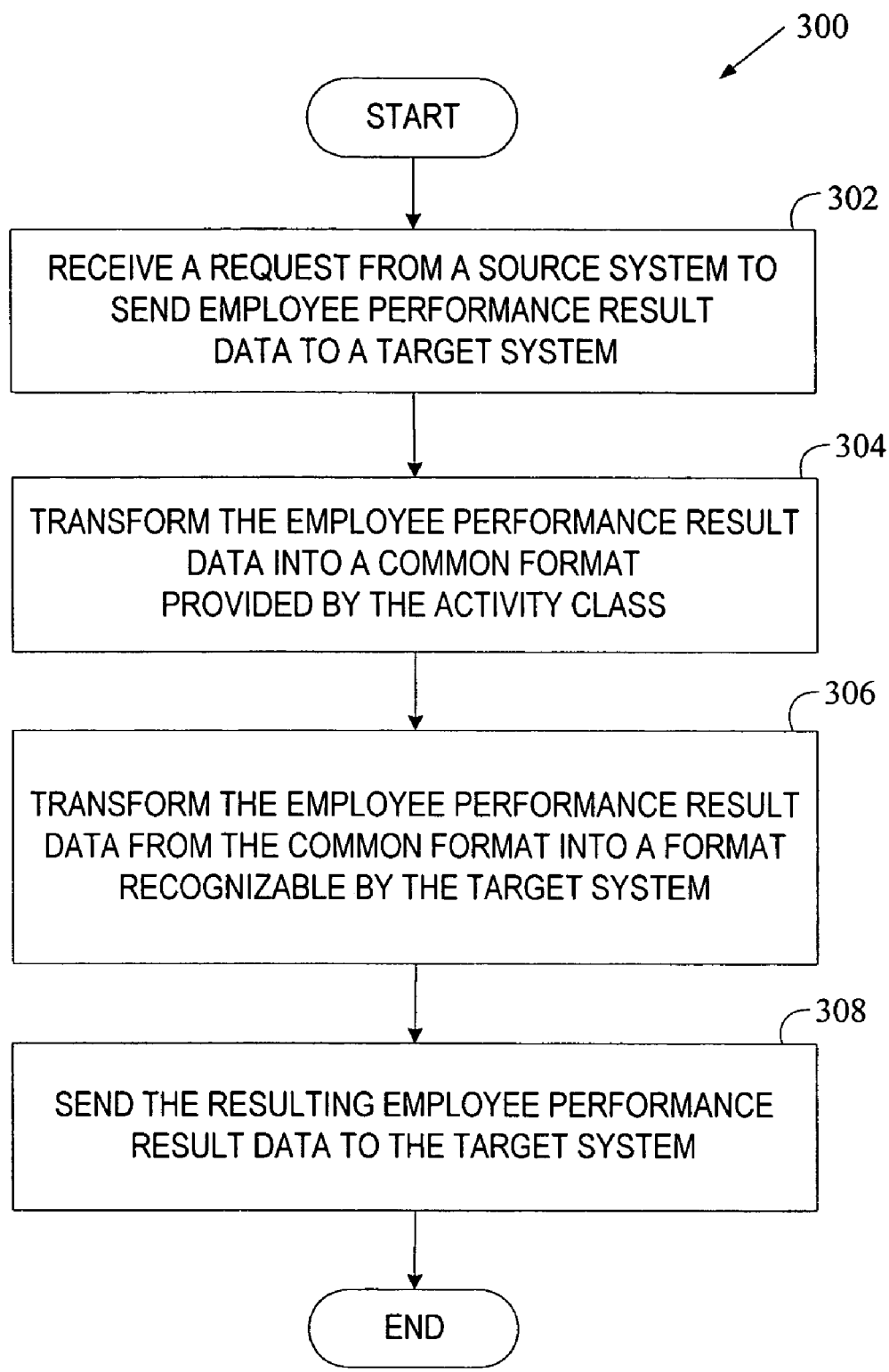
FIG. 3 is a flow diagram of one embodiment of a process for facilitating the sharing of employee performance result data between two applications.

FIG. 3 is a flow diagram of one embodiment of a process 300 for facilitating the sharing of employee performance result data between two applications utilizing employee performance result data. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

Referring to FIG. 3, process 300 begins with processing logic receiving a request from a source system to send employee performance result data to a target system (processing block 302). For example, employee performance result data may pertain to an employee of a software company, a source system may be an HRM or ERM application used by the software company, and a target system may be an HRM or ERM application used by the software company's client for which the employee performs a particular task. In another example, employee performance result data may pertain to an employee a software company, a source system may be an HRM application used by the software company, and a target system may be an ERM application used by the software company.

Next, processing logic transforms the employee performance result data into a common format provided by the employee performance result class (processing block 304). The employee performance result class defines relationships of an employee performance result with various entities related to the employee performance result. These entities may include, for example, a related employee (an employee associated with the employee performance result), related reviews (reviews of the employee's performance), and a related time period (a time period associated with the employee performance result).

Further, processing logic transforms the employee performance result data from the common format into a format recognizable by the target system (processing block 306) and sends the resulting employee performance result data to the target system (processing block 308).

Thus, according to the process 300, the sharing of employee performance result data between two systems does not require data mapping between the data format of the source application and the data format of the target application. Instead, the mapping is performed between each system and the common data model. Furthermore, the process 300 allows various divisions and/or organizations to share the employee performance result data in a manner that allows access to up-to-date employee performance result information by all participating parties, thus improving employee relationship management within the organization.

As discussed above, in one embodiment, each class of the employee performance result data model can be customized for a specific business system or application.

Figure 4:
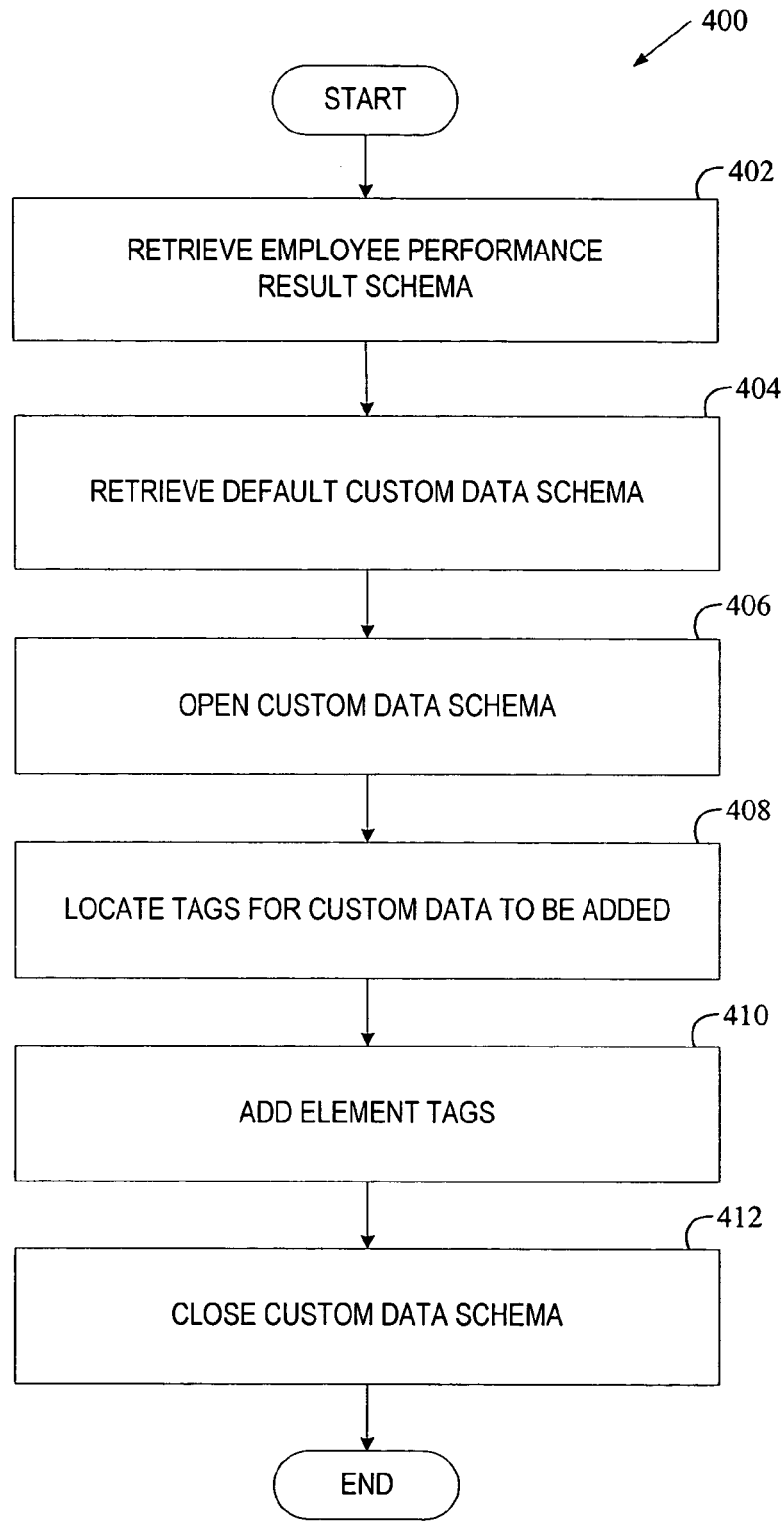
FIG. 4 is a flow diagram of one embodiment of a process for adding custom data to an employee performance result class.

FIG. 4 is a flow diagram of one embodiment of a process for adding custom data to employee performance result class. The process may be performed by processing logic that may comprise hardware (e.g., circuitry, dedicated logic, etc.), software (such as run on a general purpose computer system or a dedicated machine), or a combination of both. Processing logic may reside on an integration server such as the integration server 200 of FIG. 2.

At processing block 402, processing logic retrieves a data definition schema for the employee performance result class. The schema may be an XML schema file that includes a custom data element of a type that is defined in another file.

At processing block 404, processing logic retrieves the custom data schema for the types of custom data. The schema may be stored in an XML schema file that contains the definition for each type of custom data.

Next, processing logic opens the custom data schema (processing block 406) and locates the tags relating to the custom data type of interest (processing block 408).

Further, processing logic adds the custom data elements to the located tags (processing block 410) and closes the custom data schema with the newly defined data elements (processing block 412).

One embodiment of a common data model representing an employee performance result will now be described in more detail in conjunction with FIGS. 5-9. One skilled in the art will appreciate that various other common data models representing employee performance result can be used with the present invention without loss of generality. In addition, the names of data elements illustrated in FIGS. 5-9 are descriptive of the information stored in the data elements.

Figure 5:
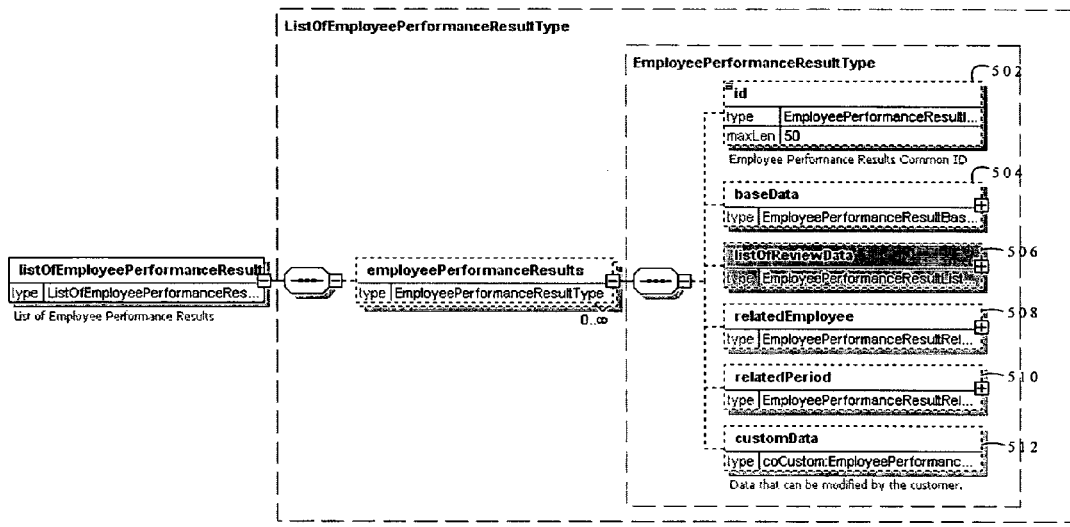
FIGS. 5-9 illustrate one embodiment of a common data model representing an employee performance result.

FIG. 5 illustrates the listOfEmployeePerformanceResult data elements of the employee performance result class in one embodiment. The listOfEmployeePerformanceResult data elements include id 502, baseData 504, listOfReviewData 506, relatedEmployee 508, relatedPeriod 510, and customData 512.

The id data element 502 may be a unique identifier of an employee's performance result. The baseData data element 504 contains general information pertaining to the employee performance result as will be discussed in more detail below in conjunction with FIG. 6. The listOfReviewData data element 506 contains review data as will be discussed in more detail below in conjunction with FIG. 7. The relatedEmployee data element 508 contains information on an employee for whom performance results are maintained, as will be discussed in more detail below in conjunction with FIG. 8. The relatedPeriod data element 510 contains information on a time period associated with the employee performance result, as will be discussed in more detail below in conjunction with FIG. 9. The customData data element 512 initially contains no data elements, but custom data elements can be added by defining data elements in the EmployeePerformanceResultCustomDataType.

Figure 6:
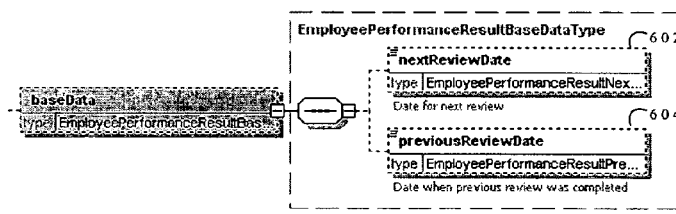

FIG. 6 illustrates the base data elements of the baseData class in one embodiment. The data elements of the baseData class include nextReviewData 602, and previousReviewDate 604.

The nextReviewData data element 602 specifies the date of the next review. The previousReviewDate data element 604 specifies the date of a previous review.

Figure 7:
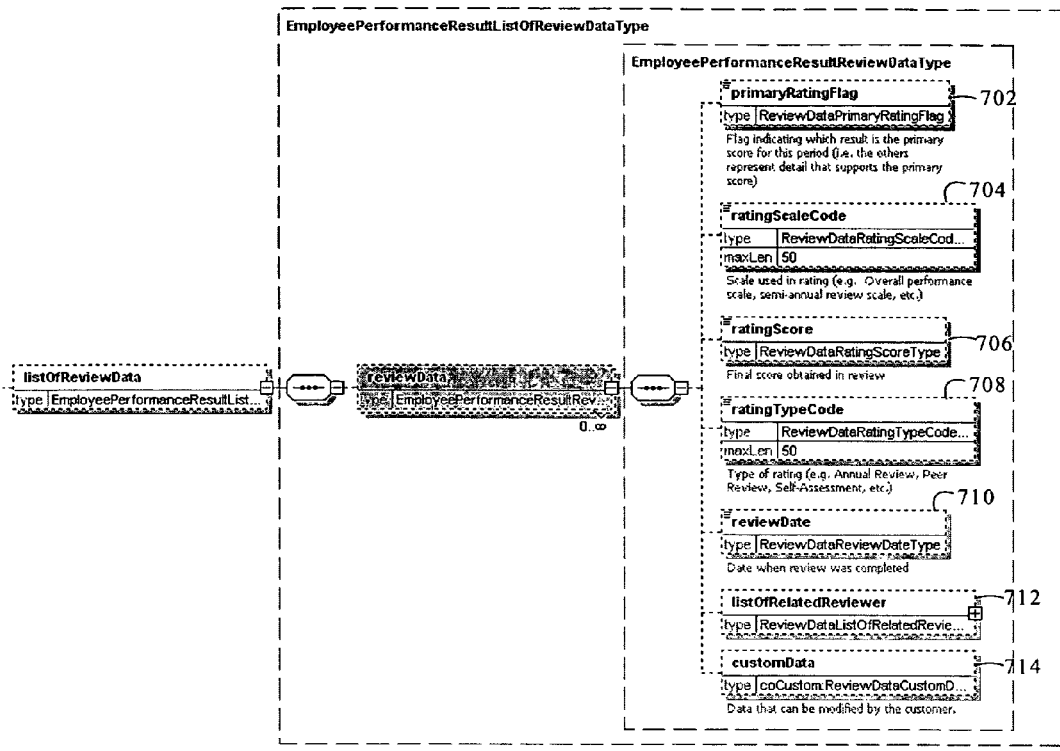

FIG. 7 illustrates the data elements of the listOfReviewData class in one embodiment. The listOfReviewData data elements include primaryRatingFlag 702, ratingScaleCode 704, ratingScore 706, ratingTypeCode 708, reviewDate 710, listOfRelatedReviewer 712 and customData 714.

The primaryRatingFlag data element 702 contains a flag indicating which result is the primary score for this period. If the primaryRatingFlag data element 702 indicates that the result is not the primary score for this period, then the result represents a detail that supports the primary score. The ratingScaleCode data element 704 identifies the scale used in rating (e.g., overall performance scale, semi-annual review scale, etc.). The ratingScore data element 706 identifies the final score obtained in the review. The ratingTypeCode data element 708 identifies the type of rating (e.g., annual review, peer review, self-assessment, etc.). The reviewDate data element 710 identifies the date when review was completed. The listOfRelatedReviewer data element 712 identifies a reviewer who performed the review. The customData data element 714 initially contains no data elements, but custom data elements can be added by defining data elements in the EmployeePerformanceResultCustomDataType.

Figure 8:
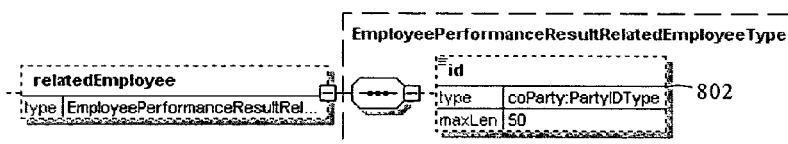

FIG. 8 illustrates the data element of the relatedEmployee class in one embodiment. The related Employee class references a party class representing a party. The related Employee data element includes id 802, which identifies the party id type.

Figure 9:
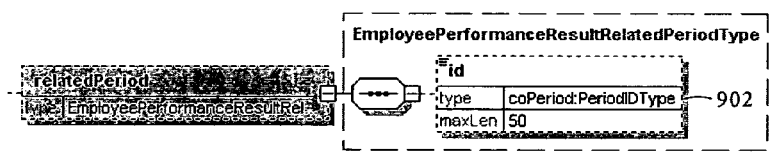

FIG. 9 illustrates the data element of the relatedPeriod class in one embodiment. This data element includes relatedPeriod 902. The relatedPeriod data element 902 identifies the time period associated with the employee performance result.

Figure 10:
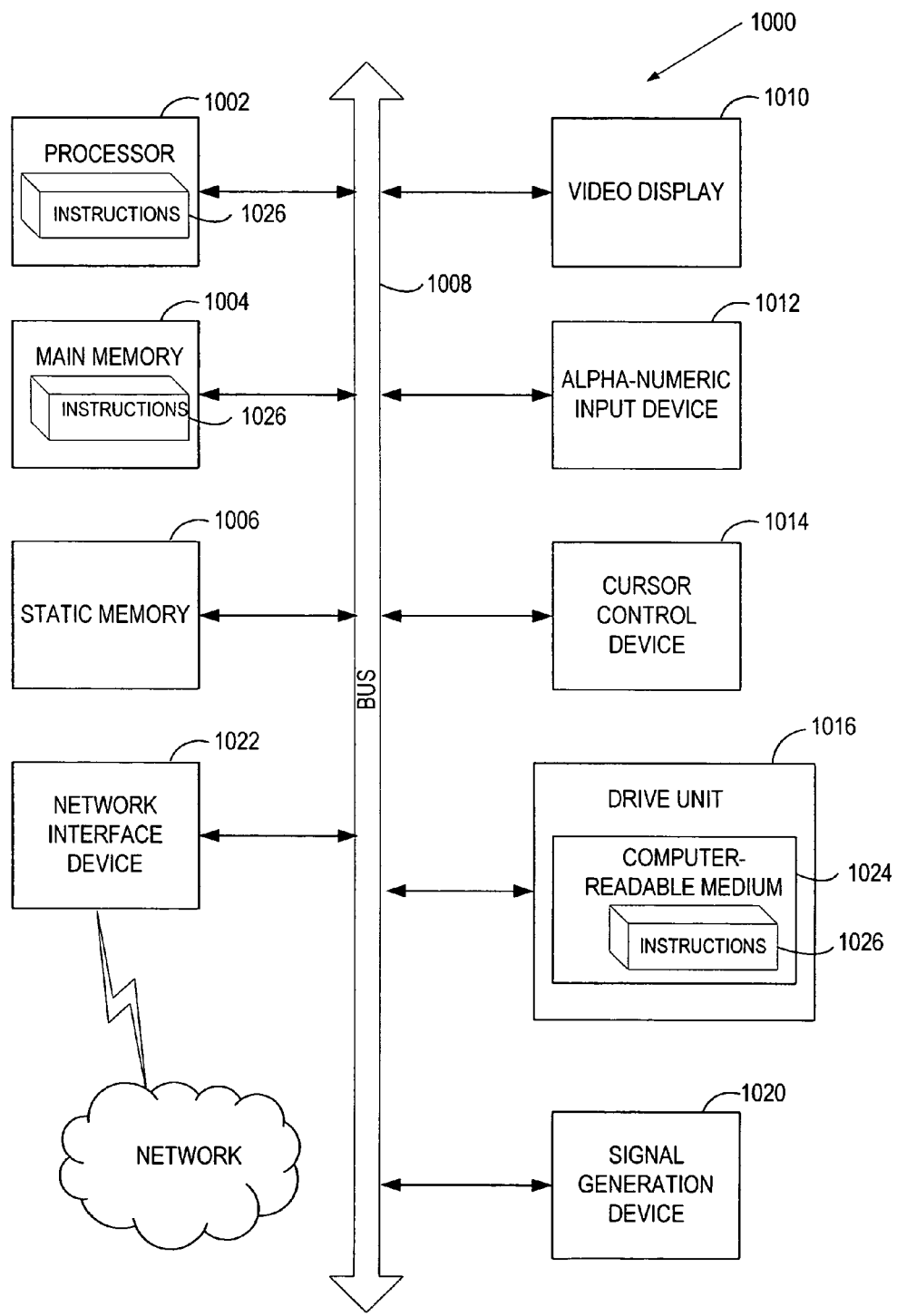
FIG. 10 is a block diagram of an exemplary computer system that may be used to perform one or more of the operations described herein.

FIG. 10 is a block diagram of an exemplary computer system 1000 (e.g., of the integration server 200 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1508. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method in a computer system comprising:
   defining, using a processor of the computer system, an employee performance result class, wherein the computer system is an integration server,
      the employee performance result class represents an employee performance result, and
      the employee performance result class is configured to
         identify a set of relationships of the employee performance result with a plurality of entities related to the employee performance result,
         allow employee performance result data in a source format to be transformed into employee performance result data in a common format, using a first transformation, and
         allow the employee performance result data in the common format to be transformed into employee performance result data in at least one target format, using a second transformation,
      the first transformation and the second transformation are different from one another, and
      the common format is provided by the employee performance result class;
   defining, using the processor, a business process, wherein
      the business process is configured to be used in controlling a plurality of business applications,
      the plurality of business applications are maintained on a plurality of business systems, and
      the plurality of business systems are coupled to the integration server; and
   transforming, using the processor, employee performance result data from a source business application into employee performance result data for a target business application, wherein the source business application is configured to use the source format, the target business application is configured to use the target format, the transforming uses the common format, and the transforming comprises
      creating an employee performance object by instantiating the employee performance result class, and
      invoking function of the employee result object in accordance with the business process.

2. The method of claim 1 wherein the plurality of entities related to the employee performance result comprises entities selected from a group consisting of a related employee, related reviews, and a related time period.

3. The method of claim 1 wherein the employee performance result class comprises a custom data element for defining one or more custom data fields for the employee performance result class.

4. The method of claim 3 wherein the one or more custom data fields of the employee performance result class are specific to an application.

5. The method of claim 1 further comprising:
instantiating the employee performance result class; and
initializing data elements of the instantiated employee performance result class.

6. The method of claim 5 further comprising:
transforming data received from a source business application into the common format of the employee performance result class;
transforming the data from the common format into a target format of the target business application; and
sending the data in the target format to the target business application.

7. The method of claim 1 wherein a definition of the employee performance result class is represented as an XML schema.

8. A method for data transformation in a computer system, the method comprising:
receiving, using a processor of the computer system, employee performance result data from a source application;
defining, using the processor, a business process, wherein
the business process is configured to be used in controlling a plurality of business applications,
the source application is one of the plurality of business applications, and
the plurality of business applications are maintained on a plurality of business systems; and
transforming, using the processor, the employee performance result data from
the source application into a common format, wherein
the source application is configured to use a source format,
the common format is provided by an employee performance result class,
the transforming comprises,
creating an employee performance result object by instantiating the employee performance result class, and
invoking a function of the employee performance result object in accordance with the business process, and
the employee performance result class is configured to
identify a set of relationships of an employee performance result with a plurality of entities related to the employee performance result.

9. The method of claim 8 wherein the plurality of entities related to the employee performance result comprises entities selected from a group consisting of a related employee, related reviews, and a related time period.

10. The method of claim 8 wherein the employee performance result class comprises a custom data element for defining one or more custom data fields for the employee performance result class.

11. A computer-readable storage medium having executable instructions to cause a machine to perform a method comprising:
defining an employee performance result class, wherein
the employee performance result class represents an employee performance result, and
the employee performance result class is configured to
identify a set of relationships of the employee performance result with a plurality of entities related to the employee performance result,
allow employee performance result data in a source format to be transformed into employee performance result data in a common format, using a first transformation, and
allow the employee performance result data in the common format to be transformed into employee performance result data in at least one target format, using a second transformation,
the first transformation and the second transformation are different from one another, and
the common format is provided by the employee performance result class;
defining. using the processor, a business process, wherein
the business processor is configured to be used in controlling a plurality of business applications,
the plurality of business applications are maintained on a plurality of business systems, and
the plurality of business systems are coupled to the integration server; and
transforming, using the processor, employee performance result data from a source business application into employee performance result data for a target business application, wherein
the source business application is configured to use the source format,
the target business application is configured to use the target format,
the transforming uses the common format, and
the transforming comprises
creating an employee performance result object by instantiating the employee performance result class, and
invoking a function of the employee performance result object in accordance with the business process.

12. The computer-readable storage medium of claim 11 wherein the plurality of entities related to the employee performance result comprises entities selected from a group consisting of a related employee, related reviews, and a related time period.

13. The computer-readable storage medium of claim 11 wherein the employee performance result class comprises a custom data element for defining one or more custom data fields for the employee performance result class.

14. The computer-readable storage medium of claim 13 wherein a definition of the employee performance result class is represented as an XML schema.

15. A computer-readable storage medium having executable instructions to cause a machine to perform a method comprising:
receiving employee performance result data from a source application;
defining, using the processor, a business process, wherein
the business process is configured to he used in controlling a plurality of business applications,
the source application is one of the plurality of business applications, and
the plurality of business applications are maintained on a plurality of business systems; and
transforming, using the processor, the employee performance result data from
the source application into a common format, wherein
the source application is configured to use a source format, the common format is provided by the employee performance result class,
the transforming uses a first mapping,
the transforming comprises,
creating an employee performance result object by instantiating the employee performance result class, and
invoking a function of the employee performance result object in accordance with the business process, and
the employee performance result class is configured to identify a set of relationships of an employee performance result with a plurality of entities related to the employee performance result.

16. The computer-readable storage medium of claim 15 wherein the plurality of entities related to the employee performance result comprises entities selected from a group consisting of a related employee, related reviews, and a related time period.

17. The computer-readable storage medium of claim 15 wherein the employee performance result class comprises, a custom data element for defining one or more custom data fields for the employee performance result class.

18. A system comprising:
a processor; and
a computer-readable storage medium, coupled to the processor, wherein
a plurality of instructions are encoded in the computer-readable storage medium, and
the instructions are configured to cause the processor to
define an employee performance result class, wherein
the employee performance result class represents an employee performance result,
the employee performance result class is configured to
identify a set of relationships of the employee performance result with a plurality of entities related to the employee performance result,
allow employee performance result data in a source format to be transformed into employee performance result data in a common format, using a first transformation, and
allow the employee performance result data in the common format to be transformed into employee performance result data in at least one target format using a second transformation
the first transformation and the second transformation are different from one another, and
the common format is provided by the employee performance result class,
define a business process, wherein
the business process is configured to be used in controlling a plurality of business applications.,
the plurality of business applications are maintained on a plurality of business systems, and
the plurality of business systems are coupled to the integration server, and
transform employee performance result data from a source business application into employee performance result data for a target business application, wherein
the source business application is configured to use the source format,
the target business application is configured to use the target format,
transforming the employee performance result data uses the common format, and
the transforming comprises
creating an employee performance result object by instantiating the employee performance result class, and
invoking a function of the employee performance result object in accordance with the business process.

19. The system of claim 18 wherein the plurality of entities related to the employee performance result comprises entities selected from a group consisting of a related employee, related reviews, and a related time period.

20. A system comprising:
processor; and
a computer-readable storage medium, coupled to the processor, wherein
a plurality of instructions are encoded in the computer-readable storage medium, and
the instructions are configured to cause the processor to
receive employee performance result data from a source application,
define a business process, wherein
the business process is configured to be used in controlling a plurality of business applications,
the source application is one of the plurality of business applications, and
the plurality of business applications are maintained on a plurality of business systems, and
transform the employee performance result data from the source application into a common format, wherein
the source application is configured to use a source format,
the common format is provided by the employee performance result class,
transforming the employee performance result data uses a first mapping,
the transforming comprises,
creating an employee performance result object by instantiating the employee performance result class, and
invoking a function of the employee performance result object in accordance with the business process, and
the employee performance result class is configured to identify a set of relationships of an employee performance result with a plurality of entities related to the employee performance result.

21. The system of claim 20 wherein the plurality of entities related to the employee performance result comprises entities selected from a group consisting of a related employee, related reviews, and a related time period.

22. An apparatus for representing a class definition, the apparatus comprising:
means for defining an employee performance result class wherein
the employee performance result class represents an employee performance result,
the common format is provided by the employee performance result class,
the employee performance result class is configured to
identify a set of relationships of the employee performance result with a plurality of entities related to the employee performance result, allow employee performance result data in a source format to be transformed into employee performance result data in a common format, using a first transformation, and allow the employee performance result data in the common format to be transformed into employee performance result data in at least one target format, using a second transformation, and the first transformation and the second transformation are different from one another;

means for defining a business process, wherein the business process is configured to be used in controlling a plurality of business applications, the plurality of business applications are maintained on a plurality of business systems, and the plurality of business systems are coupled to the integration server; and means for transforming employee performance result data from a source business application into employee performance result data for a target business application, wherein the source business application is configured to use the source format, the target business application is configured to use the target format, the means for transforming uses the common format, and the means for transforming comprises means for creating an employee performance result object comprising means for instantiating the employee performance result class, and means for invoking a function of the employee performance result object in accordance with the business process.

23. An apparatus for data transformation, the apparatus comprising:

means for receiving employee performance result data from a source application;

means for defining a business process, wherein the business process is configured to be used in controlling a plurality of business applications, the source application is one of the plurality of business applications, and the plurality of business applications are maintained on a plurality of business systems; and means for transforming the employee performance result data from the source application into a common format, wherein the source application is configured to use a source format, the common format is provided by the employee performance result class, the means for transforming comprises, means for creating an employee performance result object comprising means for instantiating the employee performance result class, and means for invoking a function of the employee performance result object in accordance with the business process, and the employee performance result class is configured to identify a set of relationships of an employee performance result with a plurality of entities related to the employee performance result.

24. The method of claim 8 further comprising:

transforming the common format into the target format.

\* \* \* \* \*

UNITED STATES PATENT AND TRADEMARK OFFICE
CERTIFICATE OF CORRECTION

| | | |
|---|---|---|
| PATENT NO. | : 7,865,390 B2 | Page 1 of 1 |
| APPLICATION NO. | : 10/851306 | |
| DATED | : January 4, 2011 | |
| INVENTOR(S) | : Caroline Muralitharan et al. | |

It is certified that error appears in the above-identified patent and that said Letters Patent is hereby corrected as shown below:

In column 8, line 44, in claim 1, delete "process,wherein" and insert -- process, wherein --, therefor.

In column 8, line 60, in claim 1, after "performance" insert -- result --.

In column 8, line 62, in claim 1, after "invoking" insert -- a --.

In column 8, line 62, in claim 1, after "employee" insert -- performance --.

In column 10, line 16, in claim 11, delete "defining." and insert -- defining, --, therefor.

In column 10, line 17, in claim 11, delete "processor" and insert -- process --, therefor.

In column 10, line 57, in claim 15, delete "he" and insert -- be --, therefor.

In column 11, line 21, in claim 17, delete "comprises," and insert -- comprises --, therefor.

In column 11, line 48, in claim 18, delete "format" and insert -- format, --, therefor.

In column 11, line 48, in claim 18, after "transformation" insert -- , --.

In column 11, line 55, in claim 18, delete "applications.," and insert -- applications, --, therefor.

In column 12, line 15, in claim 18, before "processor" insert -- a --.

In column 12, line 58, in claim 22, after "class" insert -- , --.

In column 13, line 1, in claim 22, after "allow" insert -- transformation --.

In column 13, line 11, in claim 22, delete "process ," and insert -- process, --, therefor.

Signed and Sealed this
Tenth Day of January, 2012

David J. Kappos
*Director of the United States Patent and Trademark Office*